Jan. 13, 1970     L. C. MEYNELL     3,489,162
APPARATUS FOR MIXING FLUIDS IN CONSTANT PROPORTIONS
Filed July 30, 1968
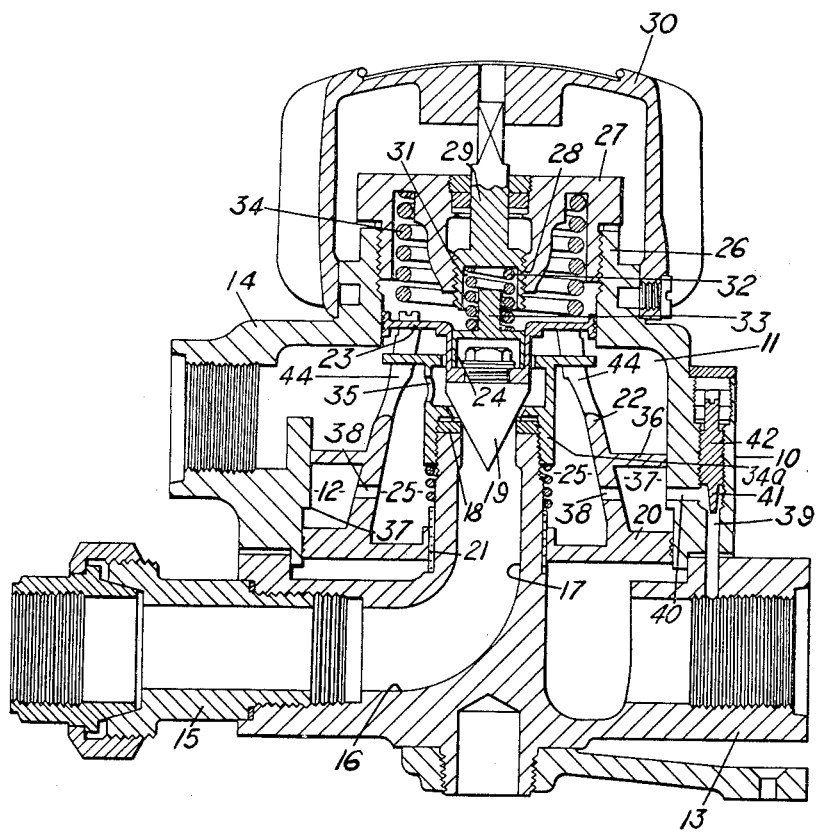
Inventor
LIONEL CHARLES MEYNELL
By *Kurt Kelman*
            AGENT United States Patent Office 3,489,162
Patented Jan. 13, 1970

3,489,162
APPARATUS FOR MIXING FLUIDS IN
CONSTANT PROPORTIONS
Lionel Charles Meynell, Tettenhall, near Wolverhampton, England, assignor to Meynell Valves Limited, Wolverhampton, England, a British company
Filed July 30, 1968, Ser. No. 748,682
Claims priority, application Great Britain, Aug. 2, 1967, 35,401/67
Int. Cl. G05d 11/03; F16k 19/00
U.S. Cl. 137—100                                    10 Claims

ABSTRACT OF THE DISCLOSURE

An apparatus for mixing first and second fluids comprising a chamber having a piston working therein, the piston having an annular wall on one side thereof to provide a mixing chamber within the wall, the second fluid being fed directly to the mixing chamber and the first fluid being fed thereto through a passage of restricted cross-section provided in the wall of the body and into a space provided between the interior of the body and the outside of the annular wall on the piston. The piston is provided with a skirt on its annular wall and at least one aperture in the annular wall to cause the first fluid to flow from the above mentioned space into the mixing chamber to mix with the second fluid before passing out of the mixing chamber to a fluid mixture outlet. The passage of restricted cross-section is provided with a valve to control the rate of first fluid flow through the passage of restricted cross-section.

BACKGROUND OF THE INVENTION

Field of the invention and description of the prior art

This invention relates to apparatus for mixing first and second fluids and comprising a body, a piston working in the body, a first fluid inlet to admit the first fluid to the body on one side of the piston, a second fluid inlet to admit the second fluid to the body on the side of the piston remote from said first fluid inlet, said piston being operatively connected to a valve member controlling the inlet of the second fluid into the body and said piston having an annular wall on its said remote side defining a mixing chamber for the first and second fluids within said annular wall and providing a space outside said wall between the wall and the body, the inlet for said second fluid being arranged so as to deliver the second fluid directly into said mixing chamber, means delivering said first fluid to said chamber, a passage or restricted cross section leading from said one side of said piston to said remote side to permit passage of said first fluid therethrough and an outlet for the fluid mixture communicating with said mixing chamber. Such apparatus will be referred to hereinafter as "of the type described."

For example, the first fluid may be a cold fluid, for example, cold water, which is to be mixed with a second fluid which is a hot fluid, for example steam, for the purpose of producing hot water.

With such prior apparatus it has not been possible to readily adjust the flow rate of the first fluid through the apparatus because this is governed by the rate at which the first fluid passes through said passage of restricted cross section. Because the passage of restricted cross section is provided in the piston it is not possible to adjust the rate of flow of the first fluid through the passage without gaining access to the piston by dismantling the apparatus.

It is, therefore, an object of the present invention to provide an improved construction of such apparatus which will enable ready adjustment of the rate of flow of the first fluid through the apparatus and which will also provide intimate mixing of the fluids.

BRIEF SUMMARY OF THE INVENTION

The invention is, in apparatus of the type described, the improvement wherein said passage of restricted cross-section is provided in the wall of the body and is provided with valve means to control the passage of said first fluid therethrough and in that the piston has a skirt extending from said annular wall and defining an annular space between the exterior of the annular wall and the interior of the body within which space said passage of restricted cross-section communicates and there being at least one passage through said annular wall from said annular space to the mixing chamber.

By providing the passage of restricted cross-section in the wall of the body instead of in the piston it is possible to provide a manually operable valve in the passage of restricted cross-section to control the rate of first fluid flow therethrough. However, because the passage of restricted cross-section feeds fluid into the space between the outside of the annular wall of the piston and the body, the fluid cannot pass into the mixing chamber within the piston and so mixing of the first and second fluids only occurs in the annular space around the upper end of the piston which constitutes the passage to the fluid mixture outlet and hence satisfactory mixing is not achieved. To overcome this problem the heretofore mentioned skirt and apertures are provided on and in the piston to cause the first fluid to flow from said space through the annular wall into the mixing chamber within the piston where the first fluid mixes correctly with the second fluid before leaving the mixing chamber and passing to the mixture outlet.

BRIEF DESCRIPTION OF THE DRAWINGS

A mixing valve for mixing cold water and steam in constant proportions to produce a hot water mixture will now be described in more detail by way of example with reference to the accompanying drawing which is a cross section through a mixing valve according to the invention.

DESCRIPTION OF THE PREFERRED EMBODIMENT

The valve of the present example may be used, for example, for supplying showers or for supplying a spray gun with hot water for cleaning purposes.

The valve comprises a generally cylindrical body 10, the interior of which forms a cylinder 11 within which a piston 12 is slidably mounted and at one end the body 10 has a radially outwardly extending passage 13 which forms an inlet for the cold water, whilst at the opposite end of the body 10 has a radially outwardly extending passage 14 which forms an outlet for the fluid mixture, which in the present example is hot water, such outlet being adapted to be connected to the position at which the hot water is to be supplied, such as a shower or wash basin or a battery of wash basins or a spray gun.

At the end of the body at which the cold water inlet is situated there is also provided an inlet connection 15 for a supply of steam and a passage 16 extends radially inwardly from said steam inlet connection to a position at the central axis of the body at which position the passage bends through a right angle and extends inwardly along the axis of the body in the form of a central, coaxially disposed tube 17 which extends axially within the body 10 and at its upper end is provided with a valve seat 18 with which cooperates a valve member 19 for controlling the inlet of steam into the remainder of the body 10.

The piston 12, mounted within the cylinder 11, has a base portion 20 of circular form machined to be a good sliding fit in the cylinder 11 and the piston 12 is mounted slidably upon the aforesaid tube 17 which extends axially within the body, the base 20 of the piston 12 being apertured, as shown at 21, to accommodate the tube.

The base 20 is arranged so that it is closest to the end of the body 10 at which is positioned the cold water inlet 13, the other side of the piston being hereinafter referred to as the "remote side" of the piston, being remote from the cold water inlet 13.

On said remote side the piston 12 has an annular wall 22 which extends towards the end of the body having the hot water outlet 14 and which is of generally frustro-conical form with the wider diameter end thereof being connected integrally to the base 20 of the piston. At the other end of the annular wall 22 of the piston (hereinafter referred to as the tower 22 of the piston) there is secured a support plate 23 for the valve member 19, said support plate 23 having a central downwardly extending collar 24 to the under side of which is secured the valve member 19 which has operative engagement with the valve seating 18 provided at the end of the steam inlet tube 17 (which is situated within the tower 22 of the piston), the arrangement being that a space which is within the tower 22 and to the outside of said steam inlet tube 17 constitutes a mixing chamber 25 within which the cold water and steam mix as hereinafter to be described.

As the end of the body 10 remote from the cold water inlet 13 there is an axially extending collar 26 which is internally threaded and at this end there is provided a cap 27 which screws into the collar 26 and has a central downwardly extending sleeve portion 28 which is internally threaded and which receives in threaded engagement an end of an adjusting spindle 29 which projects outwardly beyond the cap and has secured to its outer end a knob 30 for manual operation for a purpose hereinafter to be described.

The end of the adjusting spindle 29 within the body 10 has a cylindrical recess 31 in which is engaged one end of a small coil compression spring 32, the other end of which spring is engaged against the support plate 23 for the valve member 19 and is located around an upwardly projecting spigot 33 on said support plate 23. A further, larger, coil compression spring 34 is provided, acting between the under side of said cap 27 screwed into the sleeve 26 and the upper side of the support plate 23 for the valve member 19. This compression spring 34 provides a constant force tending to urge the valve member 19 into sealing engagement with the seat 18. The steam pressure at which the valve opens can be adjusted in order to adjust the desired temperature of the mixture by rotation of the aforesaid hand control knob 30 which causes increase or decrease in the force exerted by the small compression spring 32 upon the valve member 19, thus providing a fine adjustment over the force urging the valv member 19 into its closed position, the valve member 19 being opened by steam pressure against this closing force as hereinafter to be described.

The upper end of the steam inlet tube 17, within the tower 22 of the piston 12, is externally threaded and has screwed thereon a collar 34 which acts as a retainer for a replaceable valve seating 18 and also extends upwardly so as to surround the valve member 19, the wall of the collar 34 being provided with a number of passages 35 so that as the valve member 19 opens, steam coming from the inlet tube 17 is directed radially outwardly through the passages 35 and directly into the mixing chamber 25 within the tower 22 of the piston 12.

The tower 22 of the piston 12 is provided with a radially outwardly extending skirt 36 which is spaced away from the base 20 of the piston and which has working engagement with the wall of the cylinder 11 and thus defines an annular space 37 on the outside of the tower 22 of the piston 12 between the skirt 36 and the base 20 of the piston. The tower 22 is provided with at least one but preferably a number of radially extending passages 38 through its wall so as to provide communication between this annular space 37 and the mixing chamber 25 within the tower.

A passage 39 of restricted cross section is provided in the wall of the body 10 of the apparatus and extends in a direction parallel to the general axis of the body from the cold water inlet 13 and communicates with a further short passage 40 extending radially inwardly through the body and communicating with said annular space 37. A needle valve 41 for adjusting the flow of cold water through said restricted cross section passage 39 is provided in an internally threaded passage in the wall of the body 10 and has a spindle 42 projecting outwardly of the body 10 and accessible from the exterior of the body 10 for the purpose of adjusting the position of the needle valve 41 in said passage 39 so as to vary the flow of cold water through said restricted cross section as may be desired to vary the differential pressure across the piston and thus vary the proportions of mixing of the cold water and steam.

The tower 22 is provided with apertures 44 to permit passage of water heated in the chamber 25 out of the chamber 25 and into the exit passage 14.

In the operation of the valve, when cold water flows through the valve due to opening of a control tap, not shown, in the cold water inlet line, not shown, connected to the inlet 13; or opening of a control on the hot water outlet, such as a shower control or a spray gun trigger, the cold water flows through the restricted cross section passage 39 and creates a differential pressure across the piston 12 and thus causes upward movement of the piston 12 in the direction to open the steam valve 18, 19 and thus allow steam to enter the mixing chamber 25 where the steam mixes with the cold water which enters the chamber 25 through the apertures 38 to produce hot water. With the mixing chamber 25 located within the tower 22 of the piston and with the presence of the skirt 36 on the outside of the piston, the cold water entering the chamber 25 from the annular space 37 defined by the skirt on the outside of the piston mixes immediately with the steam entering the mixing chamber 25 and also the presence of the skirt 36 ensures that there can be no escape, or appreciable escape, of cold water direct to the outlet 14 without the cold water mixing with the steam.

The rate of flow of the first fluid through the apparatus can be varied by adjusting the needle valve 41 as desired.

What I claim is:

1. In an apparatus for mixing first and second fluids comprising a body, a piston working in the body, a first fluid inlet to admit the first fluid to the body on one side of the piston, a second fluid inlet to admit the second fluid to the body on the side of the piston remote from said first fluid inlet, said piston being operatively connected to a valve member controlling the inlet of the second fluid into the body, and said piston having an annular wall on said remote side defining a mixing chamber for the first and second fluids within said annular wall and providing a space outside said wall between the wall and the body, the inlet for said second fluid being arranged so as to deliver the second fluid directly into said mixing chamber, means delivering said first fluid to said chamber, a passage of restricted cross section leading from said one side of said piston to said remote side to permit passage therethrough of said first fluid and an outlet for the fluid mixture communicating with said mixing chamber, the improvement wherein said passage of restricted cross section is provided in the body wall and is provided with valve means to control the passage of said first fluid therethrough and in that the piston has a skirt extending from said annular wall and defining an annular space between the exterior of the annular wall and the interior of the body with which space said passage of restricted cross section communicates and there being at least one passage through said annular wall from said annular space to the mixing chamber.

2. The improvement according to claim 1 wherein the inlet for said second fluid communicates with a tube which extends centrally into said mixing chamber.

3. The improvement according to claim 2 wherein said valve member is carried by said piston and is adapted to engage a valve seat provided on the end of the second fluid inlet tube within said mixing chamber and there being spring means acting on said valve member tending to urge said valve member into sealing engagement with said valve seat.

4. The improvement according to claim 3 wherein the spring means comprises a heavy compression spring assisted by a light compression spring, the compression of the latter being variable by mean of an operating knob and spindle rotatably mounted in the valve body.

5. The improvement according to claim 4 wherein the valve body is of generally cylindrical form, the first and second fluid inlets being formed in the base thereof, the second fluid inlet tube extending from the base axially within the body, the piston being of frusto-conical form and surrounding said tube to define said mixing chamber between said tube and said piston, the piston having a radial base flange in engagement with the inner surface of the body and the valve member, which controls the second fluid inlet being secured to the under side of the upper end of the piston, the frusto-conical wall of said piston having openings therethrough to allow the first fluid to enter the mixing chamber and the mixture of first and second fluids to pass out of said chamber to the valve outlet.

6. The improvement according to claim 5 wherein said passage of restricted cross section is provided with a needle valve for adjusting the rate of flow of fluid therethrough.

7. The improvement according to claim 3 wherein the valve body is of generally cylindrical form, the first and second fluid inlets being formed in the base thereof, the second fluid inlet tube extending from the base axially within the body, the piston being of frusto-conical form and surrounding said tube to define said mixing chamber between said tube and said piston, the piston having a radial base flange in engagement with the inner surface of the body and the valve member, which controls the second fluid inlet being secured to the under side of the upper end of the piston, the frusto-conical wall of said piston having openings therethrough to allow the first fluid to enter the mixing chamber and the mixture of first and second fluids to pass out of said chamber to the valve outlet.

8. The improvement according to claim 7 wherein said passage of restricted cross section is provided with a needle valve for adjusting the rate of flow of fluid therethrough.

9. The improvement according to claim 2 wherein the valve body is of generally cylindrical form the first and second fluid inlets being formed in the base thereof, the second fluid inlet tube extending from the base axially within the body, the piston being of frusto-conical form and surrounding said tube to define said mixing chamber between said tube and said piston, the piston having a radial base flange in engagement with the inner surface of the body and the valve member, which controls the second fluid inlet being secured to the under side of the upper end of the piston, the frusto-conical wall of said piston having openings therethrough to allow the first fluid to enter the mixing chamber and the mixture of first and second fluids to pass out of said chamber to the valve outlet.

10. The improvement according to claim 9 wherein said passage of restricted cross section is provided with a needle valve for adjusting the rate of flow of fluid therethrough.

References Cited

UNITED STATES PATENTS

| 2,211,058 | 8/1940 | Guthmann | 137—88 |
| 2,682,883 | 7/1954 | Phillips | 137—88 |
| 2,903,009 | 9/1959 | Tacchi | 137—100 |
| 3,116,748 | 1/1964 | Wasson | 137—98 |

ROBERT W. JENKINS, Primary Examiner

U.S. Cl. X.R.

137—111